(12) United States Patent
Sayers et al.

(10) Patent No.: US 7,690,559 B2
(45) Date of Patent: Apr. 6, 2010

(54) SELF-REFERENTIAL INTEGRITY CHECKING SYSTEM AND METHOD

(75) Inventors: Craig Peter Sayers, Menlo Park, CA (US); Vinay Deolalikar, Mountain View, CA (US); Salll Pradhan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 11/440,650

(22) Filed: May 24, 2006

(65) Prior Publication Data

US 2007/0273516 A1 Nov. 29, 2007

(51) Int. Cl.
*G06F 17/00* (2006.01)
(52) U.S. Cl. .................. 235/375; 235/385; 235/487
(58) Field of Classification Search .......... 235/375, 235/381, 487, 385, 383; 340/572.1
See application file for complete search history.

(56) References Cited

U.S. PATENT DOCUMENTS

| | | | | |
|---|---|---|---|---|
| 6,354,493 | B1* | 3/2002 | Mon | 235/380 |
| 6,371,375 | B1* | 4/2002 | Ackley et al. | 235/462.45 |
| 6,927,692 | B1 | 8/2005 | Petrinovic | |
| 2004/0145472 | A1* | 7/2004 | Schmidtberg et al. | 340/539.27 |
| 2005/0099268 | A1* | 5/2005 | Juels et al. | 340/10.4 |
| 2005/0108044 | A1* | 5/2005 | Koster | 705/2 |
| 2005/0150952 | A1* | 7/2005 | Chung | 235/385 |
| 2005/0156707 | A1 | 7/2005 | Kudo | |
| 2006/0087432 | A1 | 4/2006 | Corbett | |
| 2006/0132311 | A1* | 6/2006 | Kruest et al. | 340/572.4 |
| 2007/0035382 | A1* | 2/2007 | Lee et al. | 340/10.1 |
| 2007/0046439 | A1* | 3/2007 | Takaku et al. | 340/10.41 |
| 2008/0120193 | A1* | 5/2008 | Schuller et al. | 705/23 |

FOREIGN PATENT DOCUMENTS

| | | |
|---|---|---|
| EP | 1460570 | 9/2004 |
| EP | 1544770 | 6/2005 |
| WO | WO03102845 | 12/2003 |
| WO | WO2005109308 | 11/2005 |

* cited by examiner

*Primary Examiner*—Edwyn Labaze

(57) ABSTRACT

An integrity checking system includes a tag programming device that generates a plurality of identifiers. Each identifier is associated with either a storage item or an item to be stored by the storage item. The programming device stores each of the identifiers in a plurality of readable tags, each readable tag being adapted to be attached to a corresponding item. A tag reading device reads the identifiers stored in the readable tags and, using only information from the read tags, provides information indicating whether any item supposed to be stored on the storage item is missing from the storage item. Also, methods for storing and reading the identifiers are disclosed along with storing additional information about the items in the tags, such as physical information like weight and/or volume of the items, and then using this information to determine whether any items have been altered.

21 Claims, 5 Drawing Sheets

SELF-REFERENTIAL INTEGRITY CHECKING SYSTEM AND METHOD

BACKGROUND OF THE INVENTION

During the shipment of products in commerce via train, boat or airplane, for example, products are many times placed on a pallet, or on or in another suitable structure, and shipped. A recipient of a pallet ideally has a way of verifying that the contents of the pallet that was received equals the expected or contents of the pallet that was actually shipped. In other words, the recipient would like to be able to perform an integrity check to verify that the items contained on the pallet are the items originally shipped or the "expected items" for that pallet. Many situations can arise causing the shipped contents of the pallet to be different than the received contents of the pallet, such as theft of items on the pallet during transport between the shipper of the pallet and the recipient of the pallet. Another situation where an integrity check is required is authentication of products being shipped to ensure the products are actually from the purported manufacturer of the products. This is particularly important in the context of pharmaceuticals where the sale of counterfeited drugs on the gray market is a serious problem.

In an attempt to better authenticate pallets and the items contained on such pallets, radio frequency identification (RFID) tags may be placed on the pallet and items contained thereon. These RFID tags contain information identifying the pallet and information that may be utilized to determine whether the contents of the pallet have been altered during shipment. For example, an RFID tag may indicate the weight of the shipped pallet, the number of items on the shipped pallet, the number of items of each specific type on the pallet, or the physical size or volume of the pallet. Any variation between the information in the RFID tag and the actual corresponding physical characteristic of the received pallet indicates the contents of the pallet may have been altered during shipment.

A common way to check the integrity of a pallet to determine whether the shipped contents correspond to the received contents is through the use of an "aggregation tree." An identification tree defines relationships among items on the pallet and the pallet itself by defining an identification associated with the pallet as a root of the tree and defining identifications associated with each of the items contained of the pallet as leaves of the tree. In current integrity checking systems utilizing such a system, RFID tags physically attached to the pallet and to the items contained on the pallet are read and input to a backend system which then compares the read identifiers from the RFID tags to the expected identifiers stored in a database on the backend system. Thus, the backend system must be accessed for each received pallet to retrieve expected data for that pallet from the database. In many situations, however, the backend infrastructure system is not presently available.

There is a need for performing simpler and more efficient integrity checks on pallets and the contents of such pallets without requiring a backend infrastructure system.

SUMMARY OF THE INVENTION

According to one aspect of the present invention, an integrity checking system includes a tag programming device that generates a plurality of identifiers. Each identifier is associated with either a storage item or an item to be stored by the storage item. The programming device stores each of the identifiers in a plurality of readable tags, each readable tag being adapted to be attached to a corresponding item. A tag reading device reads the identifiers stored in the readable tags and, using only information from the read tags, provides information indicating whether any item supposed to be stored on the storage item is missing from the storage item.

Additional aspects of the present invention include methods for storing the identifiers in the readable tags and reading the identifiers from the tags to determine whether any items are missing from the storage item. Another aspect involves storing additional information about the items in the tags, such as physical information like weight and/or volume of the items, and then using this information to determine whether any items have been altered.

DETAILED DESCRIPTION OF PREFERRED EMBODIMENTS

Figure 1:
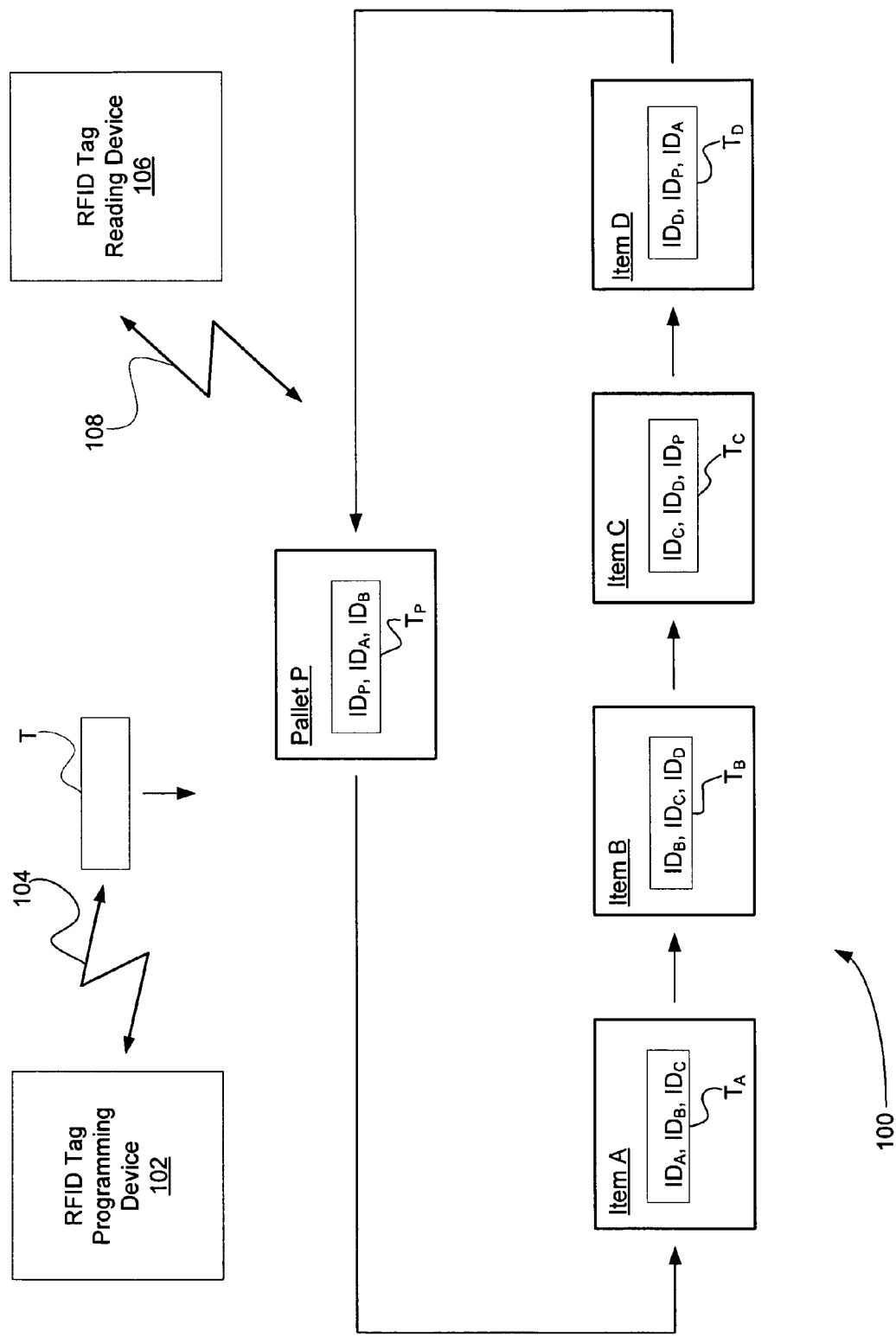
FIG. 1 is a functional diagram of a self-referential integrity check system according to one embodiment of the present invention.

FIG. 1 is a functional diagram of a self-referential integrity checking system 100 that enables a self-referential integrity check to be preformed on a pallet P and the items A-D contained on that pallet without the need for a backend infrastructure according to one embodiment of the present invention. The system 100 is termed "self-referential" since the need for reference to other data, such as an aggregation tree stored on a backend system (not shown), is eliminated. Instead, missing or altered items A-D on the pallet P may be determined through identifiers $ID_A$-$ID_D$ and $ID_P$ stored in RFID tags $T_A$-$T_D$ and $T_P$ attached to each of the items and the pallet, respectively, as will be explained in more detail below. Eliminating the need for a backend system would typically lower the cost of the integrity checking system 100 relative to conventional systems including backend portions. Also, the system 100 may be utilized in situations where installing a backend system and components necessary for interfacing to the backend system are not feasible.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention. Also note that in the present description, when utilizing reference descriptors such as $ID_A$-$ID_D$, the subscript number or letter is included when referring to a specific one of these components but these subscripts may be omitted when referring generally to all of the components associated with a given reference descriptor.

The integrity checking system 100 includes an RFID programming device 102 generating and storing desired identifiers ID in each of the RFID tags $T_A$-$T_D$ and $T_P$. The programming device 102 defines an identifier $ID_A$-$ID_D$ for each item A-D to be stored on the pallet P along with an identifier $ID_P$ for the pallet itself. After defining each of the identifiers $ID_A$-$ID_D$, the programming device 102 communicates through a communications link 104 to store each of these identifiers in a number of different RFID tags $T_A$-$T_D$ and $T_P$. These RFID tags $T_A$-$T_D$ and $T_P$ are subsequently physically attached to the corresponding items A-D or the pallet P. FIG. 1 depicts adjacent the programming device 102 a tag T being programmed by the device, with a downward arrow from the tag representing that once the tag is programmed it is attached to one of the items A-D or the pallet P. The precise manner in which the identifiers ID are stored in the tags T varies in different embodiments of the present invention, and the specifics of the example illustrated in FIG. 1 will be described in more detail below.

The integrity-checking system 100 further includes an RFID tag reading device 106 that communicates through a communications link 108 to read the identifiers ID stored in each of the RFID tags T. Using only this information from the read tags T, the reading device 106 determines or provides information that allows a user to determine whether any item A-D supposed to be stored on the pallet P is missing. The device 106 need not access any backend system (not shown) in order to make this determination since the storage of each identifier ID in multiple tags T enables the independent or "self-referential" detection of missing items A-D, as will also be described in more detail below.

The overall process of operation of the integrity checking system 100 will now be described in more detail with reference to FIG. 1 and the flowchart of FIG. 2. The process begins in step 200 and proceeds immediately to step 202 in which the programming device 102 generates the identifiers ID and stores these identifiers in the RFID tags T. In the example embodiment of FIG. 1, a chain or sequence of N identifiers ID is defined and each identifier is stored in a corresponding RFID tag and in the RFID tags corresponding to the next two identifiers in the sequence. The simplified example of FIG. 1 includes four items A-D and the pallet P, with the sequence of identifiers being defined as indicated by the arrow in the figure. Accordingly, the identifier IDA is the first identifier in the sequence, followed by the identifiers IDB, IDC, IDD, and IDP. As indicated by the arrows, the sequence is circular or loops back on itself such that with reference to the identifier IDD, for example, the next two identifiers in the sequence are the identifiers IDP and IDA.

In the embodiment of FIG. 1, each identifier ID is stored in a respective RFID tag T along with the next two identifiers in the sequence. Thus, in the RFID tag TA that is to be attached to the item A, the identifiers IDA, IDB, and IDC are stored. Similarly, in the RFID tag TB that is to be attached to the item B, the identifiers IDB, IDC, and IDD are stored. For the RFID tag TC that is to be attached to the item C the identifiers IDC, IDD, and IDP are stored while for the RFID tag TD that is to be attached to the item D the identifiers IDD, IDP, and IDA are stored. Finally, in the RFID tag IDP to be attached to the pallet P the identifiers IDP, IDA, and IDB are stored. In this way, each of the identifiers ID is redundantly stored in additional ones of the RFID tags T. More specifically, each identifier ID is stored in the RFID tag T that is to be attached to the item corresponding to that identifier and in the RFID tags that are to be attached to the items corresponding to the next two identifiers in the sequence. For example, the identifier IDA is stored in the RFID tag TA to be attached to the item A and is also redundantly stored in two additional locations, namely the RFID tag TB that is to be attached to the item B and the RFID tag TC that is to be attached to the item C.

Figure 2:
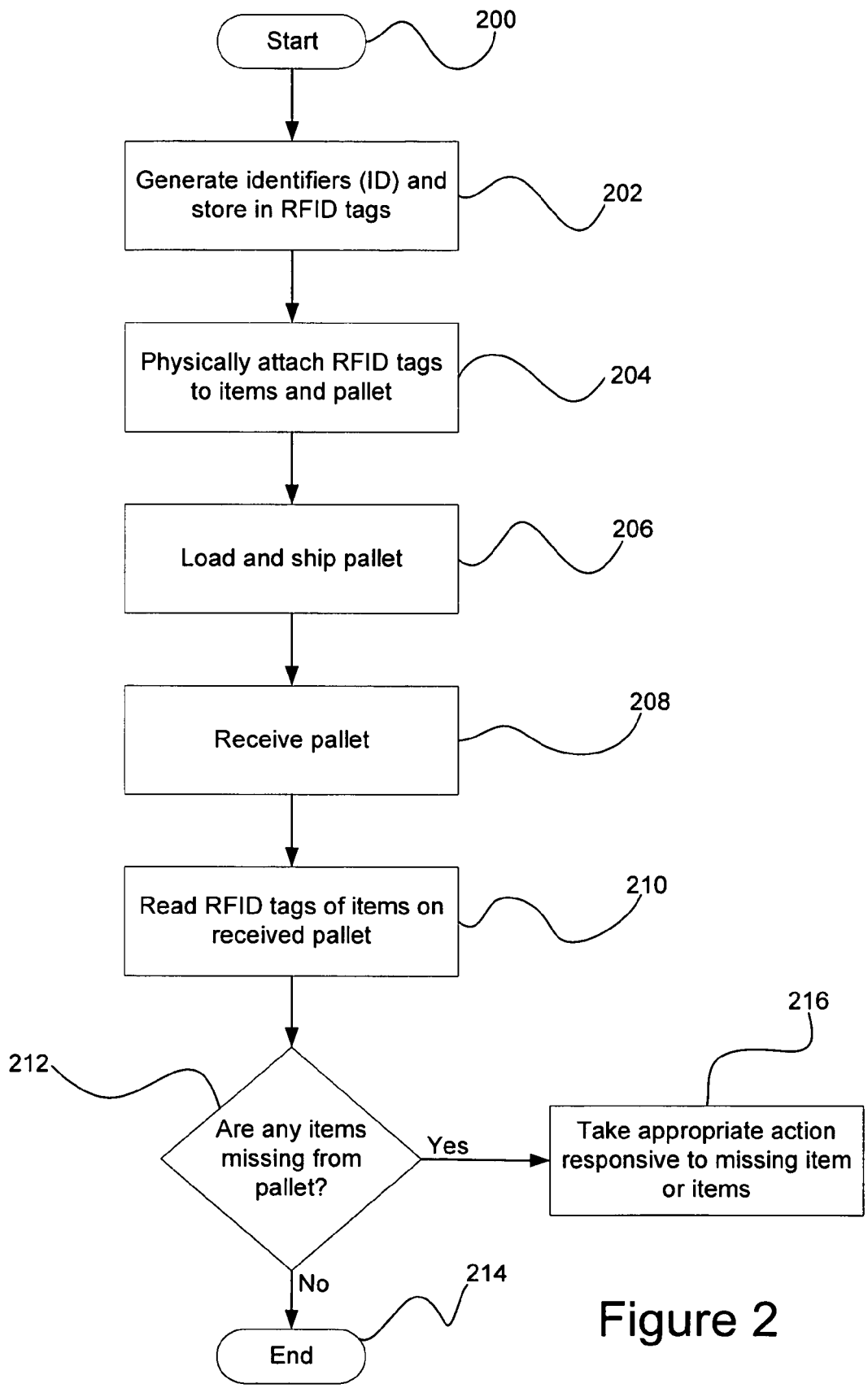
FIG. 2 is a flowchart of the operation of the self-referential integrity check system of FIG. 1 according to one embodiment of the present invention.

Once the programming device 102 has stored all the required identifiers ID in the desired RFID tags T, the process proceeds from step 202 in FIG. 2 to step 204 and the RFID tags are physically attached to the corresponding items. Note that the exact manner in which the operations performed in steps 202 and 204 of the process may vary greatly in different embodiments of the present invention. For example, the RFID tags T could first be attached to all items to be placed on the pallet P and thereafter, once the number of items to be placed on the pallet is known the sequence of identifiers ID could be generated and thereafter appropriately stored in the proper RFID tags that are already attached to the items. One skilled in the art will appreciate other variations that can be utilized to implement the underlying goal of steps 202 and 204, which is the redundant storage in multiple RFID tags T of the identifiers ID associated with each of the items.

From step 204, the process proceeds to step 206 and the items A-D are loaded onto the pallet P and the pallet is shipped to the desired recipient. The process then proceeds to step 208 and the pallet P is received by the desired recipient. After the pallet P is received, the process goes to step 210 and the RFID tag reading device 106 reads the identifiers ID stored in the RFID tags T through the communications link 108. The reading device 106 can read the RFID tags T without removing the items A-D from the pallet P, which may be advantageous for the recipient. This may be true, for example, by providing the recipient with the option of not accepting the shipment of items on the pallet P if any of the items A-D is determined to be missing, as will be discussed in more detail below.

At this point, the process goes to step 212 and the reading device 106 utilizes the read identifiers ID to determine or to provide information that allows a user to determine whether any item A-D supposed to be stored on the pallet P is missing. When the determination in step 212 is negative, meaning no items A-D are detected as missing, the process goes to step 214 and terminates. The desired items A-D have been successfully shipped to the recipient. When the determination in step 212 is negative, however, this indicates one or more items A-D may be missing from the pallet P. In this situation, the process goes to step 216 and the appropriate action is taken in response to detecting some potentially missing ones of the items A-D.

One or more item A-D may be missing from the pallet P for a variety of different reasons, such as through theft of the item while the pallet is en route to the recipient. In step 216, the recipient uses the reading device 106 to detect any missing items A-D. For example, assume item A is stolen during transport of the pallet from the shipper to the recipient. Item A will in this case be missing from the pallet P when the pallet is received by the recipient. In this situation, both the RFID tag TP attached to the pallet P and the RFID tag TD attached to item D store the identifier IDA associated with item A. In this situation, the reading device 106 could, for example, detect that the identifier IDA is stored in only two tags T, namely tags TP and TD, and provide an indication that the item A may be missing. The user could then physically inspect the pallet P and ascertain whether item A is indeed missing. This approach may be necessary because when the items A-D are still on the pallet P, the reading device 106 may be unable to read some of the RFID tags even though the tag and the corresponding item are actually present on the pallet.

In the embodiment of FIG. 1, the identifier ID associated with each item A-D and the pallet P is stored three times in three separate RFID tags T. This is merely by way of example and any number greater than one would satisfy a practical requirement that each identifier be stored in more than one RFID tag to improve the performance of the integrity checking system 100. Also note that a chain or sequence for the identifiers ID in the embodiment of FIG. 1 need not be used in determining how the redundant or additional identifiers ID are stored in the RFID tags T. For example, in another embodiment the identifiers ID associated with two other random items A-D could be stored in any given RFID tag T. This is true for the embodiment of FIG. 1 as well as for all the embodiments to be described below with reference to FIGS. 3-5.

Figure 3:
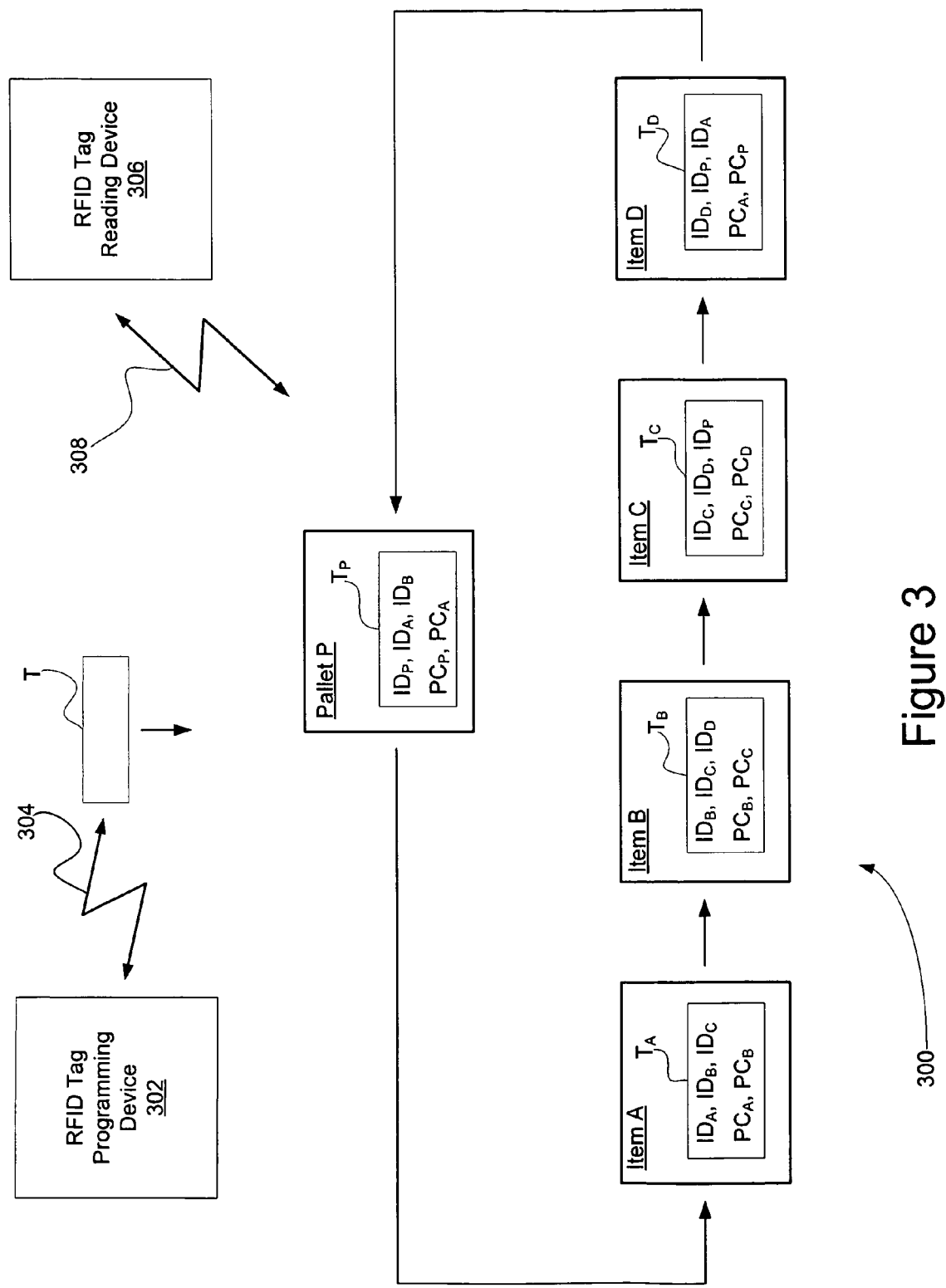
FIG. 3 is a functional diagram of a self-referential integrity checking system that utilizes the physical characteristics of items being shipped according to another embodiment of the present invention.

FIG. 3 is a functional diagram of a self-referential integrity checking system 300 that utilizes the physical characteristics of items A-D and/or the pallet P being shipped according to another embodiment of the present invention. As previously mentioned, when reading the RFID tags T of items A-D contained on the pallet P, some of these tags may not be read although the tag and corresponding item A-D is actually present on the pallet P. This means that in some instances even though the item A-D containing a specific RFID tag T is present on the pallet P, the recipient may be unable to read the RFID tag associated with that item without removing the item from the pallet. The self-referential integrity checking system 300 allows the recipient to determine whether such an erroneous reading has occurred. The system 300 includes components 302-308 that function in the same way as the corresponding components previously described with reference to FIG. 1 and which also have altered functionality to perform required functions associated with the embodiment of FIG. 4, as will now be explained in more detail.

In order to enable the system 300 to distinguish between items A-D that are actually missing and items that are present but which have RFID tags that cannot be read while the item is on the pallet P, the system stores additional information relating to the physical characteristics of the items A-D. FIG. 3 illustrates this additional information as physical characteristics data PC for each of the items A-D and the pallet P. The items A-D have the physical characteristics data $PC_A$-$PC_D$ and the pallet P has physical characteristic data $PC_P$. In the example of FIG. 3, the physical characteristics data PC for each item A-D and the pallet P is stored the RFID tag T for the corresponding item plus one other RFID tag, which is the tag associated with the next identifier in the sequence. For example, the RFID tag TA associated with item A stores the data PCA for item A along with PCB for the data PCB for the item B corresponding to the next identifier in the sequence, and so on for the remaining items and the pallet.

In this example, the data PCA-PCD of the individual items A-D could be used in determining authenticity of the received items. For example, if an unscrupulous person replaced the item A with a fake or substitute item A, pulling the RFID tag TA off the real item A and putting it on the fake item A, then the weight of the fake item would have to be the same as what was stored in the RFID tags T or else the difference could be detected. If such a difference was detected, the recipient could take appropriate action, such as taking required steps to verify the authenticity of the received item A-D.

The physical characteristics data PC for the items A-D and the pallet can vary. In one embodiment, the physical characteristics data PC is the weight of the corresponding item A-D or the pallet. In this example, upon the reading device 306 reading the RFID tags T and determining that one of the items A-D is missing on the received pallet P, the device could receive a signal indicating the weight of the received pallet (or a user could weigh the pallet). Thereafter, the device 306 compares (or a user could compare) the measured weight of the received pallet P to the data PCP read from either the RFID tag TP or TA. If the two values are equal, then no item A-D is probably missing from the pallet P, but instead the reading device 306 is simply probably not able to read the RFID tag T of an item. In contrast, if the two values are unequal, then the reading device 306 determines one of the items A-D is indeed probably missing from the pallet P.

The additional information stored in the RFID tags T varies in different embodiments of the system 300. In other embodiments the physical characteristics data PC could be the volume of each of the items A-D and the overall volume of the loaded pallet P. The overall volume and volumes of the individual items A-D could be used in processes similar to that just described above for weight to determine whether an item A-D is actually missing or whether the corresponding RFID tag T simply cannot be read. The individual volumes of each item A-D could be used in determining authenticity of the received items A-D as described for weight.

In other embodiment, the physical characteristics data PC could be the total number of items A-D on the pallet P, which would enable a user to perform a quick checksum (i.e., count the actual items on the pallet and compare this number to the physical characteristics data) where there are not too many items A-D to be counted. In another embodiment, physical characteristics data PC for groups of items A-D on the pallet P could be stored in the tags T. This data could be similarly used to do a quick checksum on the group of items containing the ostensibly missing item and in this way determine whether further action is necessary or whether the reading device 306 simply cannot read the RFID tag T of the item. All of these embodiments involving physical characteristics data PC advantageously allow checking the accuracy of a detected missing item A-D without removing all items from the pallet P, which is obviously time consuming and could result in damage or loss of items.

Figure 4:
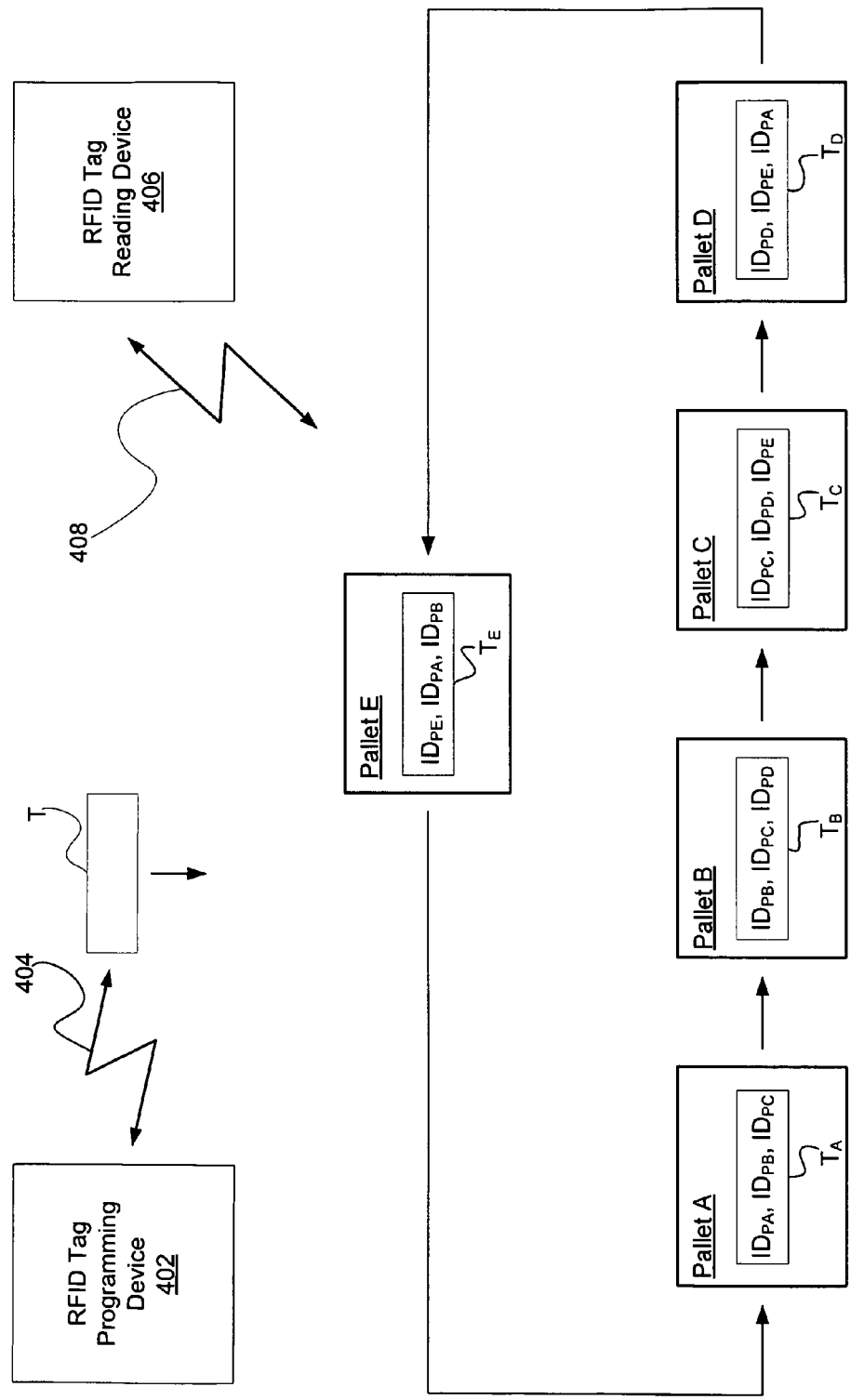
FIG. 4 is a functional diagram of a self-referential integrity checking system that stores identification information for items on a given pallet across multiple pallets according to another embodiment of the present invention.

FIG. 4 is a functional diagram of a self-referential integrity checking system 400 that stores identifiers ID for items on a given pallet across multiple pallets A-E according to another embodiment of the present invention. The system 400 includes components 402-408 that function in the same way as the corresponding components previously described with reference to FIG. 1 and which also have any altered functionality to perform required functions associated with the embodiment of FIG. 4, as will now be explained in more detail. In this example, the items on the pallets A-E are not shown and the identifiers for all items on a given pallet A-E are indicated through the designations $ID_{PA}$-$ID_{PE}$. Thus, the identifiers for all items on the pallet A correspond to the identifier $ID_{PA}$, the identifiers for all items on pallet B correspond to the identifier $ID_{PB}$, and so on for the remaining pallets C-E. The RFID tags $T_A$-$T_E$ are the tags attached to all items on the corresponding pallet A-E.

With the embodiment of FIG. 4, the identifiers ID for items on a given pallet A-E are not redundantly stored only in RFID tags $T_A$-$T_E$ attached to items on that pallet P, but are also stored in RFID tags attached to items on other pallets. In the example, the identifiers ID are stored among pallets A-E in a sequential manner analogous to that described with reference to FIG. 1. The identifiers IDA associated with the items on pallet A are thus stored not only in the RFID tags TA for items (not shown) on pallet A, but are also stored in the RFID tags TB and TC attached to items on pallets B and C. Similarly, the identifiers IDA associated with the items on pallet B are stored not only in the RFID tags TB for items (not shown) on pallet B, but are also stored in the RFID tags TC and TD attached to items on pallets C and D, and so on for the remaining pallets C-E. Note that within a given pallet, the identifiers ID for items on that pallet P can be organized and stored in a variety of different ways, such as in the embodiment of FIG. 1. Thus, on pallet A for example, the identifiers IDA stored in the RFID tags T associated with items actually contained on pallet A, could be organized as in the embodiment of FIG. 1. The distribution of identifiers ID among pallets P can also be varied, with the system 400 being merely one example to illustrate this general concept.

The embodiment of FIG. 4 provides added security since now tampering with items and RFID tags on multiple pallets P would be required to circumvent detection. Shipments may include many pallets P in some situations and the system 400 enables a recipient to determine that a particular pallet P of such a large shipment is missing. The recipient may not want to accept a shipment, for example, if a pallet P containing critical items of that shipment is missing.

Figure 5:
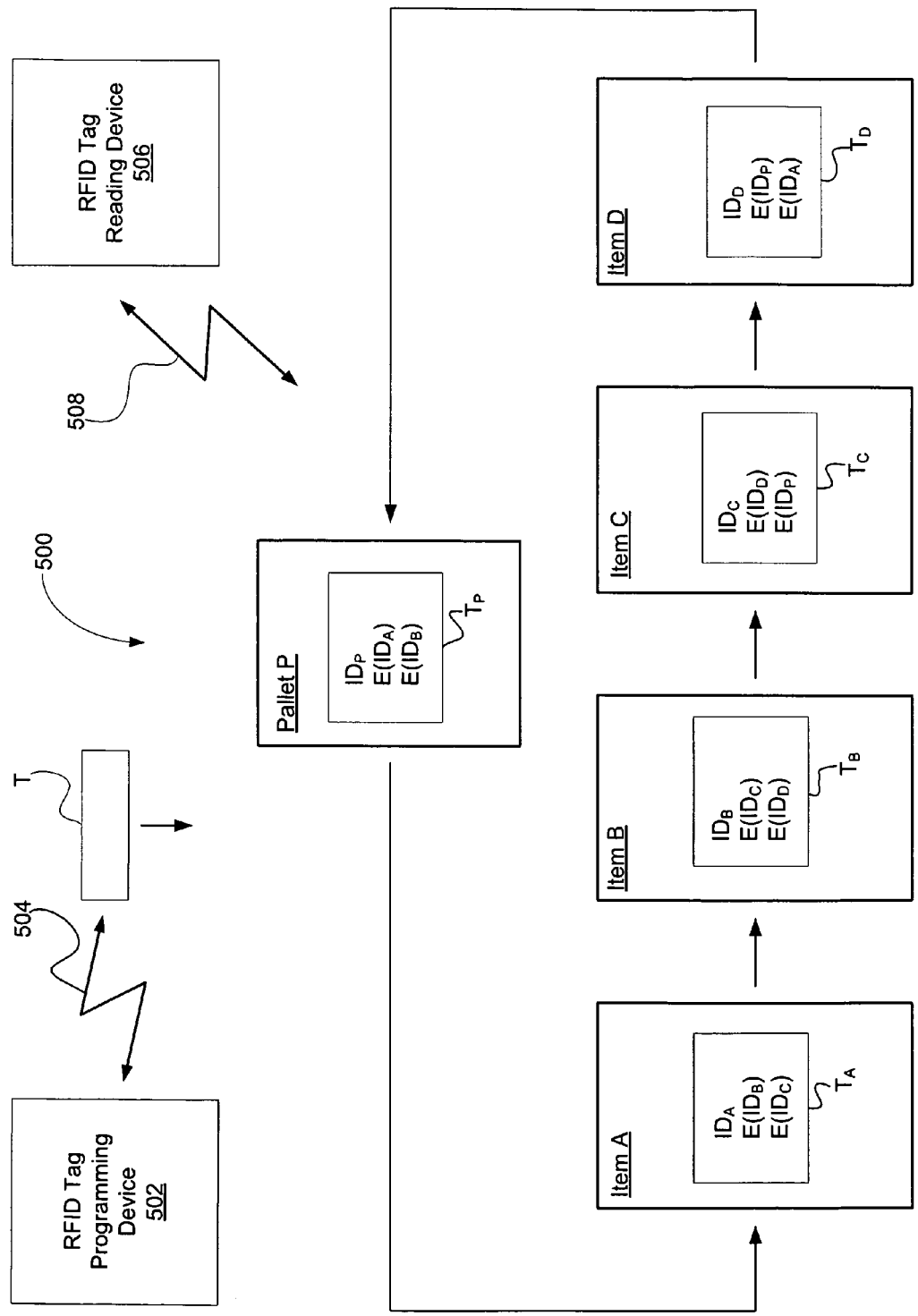
FIG. 5 is a functional diagram of a self-referential integrity checking system that stores encrypted identification information according to another embodiment of the present invention.

FIG. 5 is a functional diagram of a self-referential integrity checking system 500 that stores encrypted identification information E(ID) in RFID tags T attached to items A-D and a pallet P according to another embodiment of the present invention. Instead of merely assigning identifiers $ID_A$-$ID_D$ and $ID_P$ to the items A-D and the pallet P and then storing these identifiers in the RFID tags T, in the system 500 some or all of the identifiers are first encoded or encrypted and then stored in the RFID tags. The system 500 includes components 502-508 that function in the same way as the corresponding components previously described with reference to FIG. 1 and which also have altered functionality to perform required functions associated with the embodiment of FIG. 5, as will now be explained in more detail.

In the embodiment of FIG. 5, the identifier ID assigned to a given item A-D is stored in the RFID tag T attached to that item, along with the encrypted identifiers E(ID) for the next two identifiers in a sequence of identifiers, which may be defined as previously described with reference to FIG. 1. For example, the identifier $ID_A$ is stored in the RFID tag $T_A$ to be attached to the item A. The identifiers $ID_B$ and $ID_C$ associated with the items B and C are then encrypted to generate encrypted identifiers $E(ID_B)$ and $E(ID_C)$, and these encrypted identifiers are also stored in the RFID tag $T_A$. Similarly, the identifier $ID_B$ along with encrypted identifiers $E(ID_C)$ and $E(ID_D)$ are stored in the RFID tag $T_B$ to be attached to the item B. The remaining identifiers ID are encrypted to generate encrypted identifiers E(ID), and these identifiers and encrypted identifiers are stored in the remaining RFID tags TC, TD, and TP as illustrated in the example of FIG. 5. Utilization of the encrypted identifiers E(ID) may make it more difficult for an unauthorized person to attempt to replace authentic items A-D on the pallet P.

As discussed previously with reference to the embodiment of FIG. 1, the exact manner in which the identifiers ID and encrypted identifiers E(ID) are stored among the RFID tags T will vary in different embodiments of the present invention. The type of encryption or process of encoding used to generate the encrypted identifiers E(ID) may similarly vary in different embodiments of the present invention. For example, a hash function or a simple XOR of one identifier ID with another identifier may be utilized in generating the encrypted identifiers E(ID). Note with the system 500 identification of any missing items A-D is possible because the methodology for generating the encoded identifiers E(ID) will be known to the recipient. As a result, the recipient can decode the encrypted identifiers E(ID) and will also know how the identifiers ID and encrypted identifiers are arranged among the items so that the recipient may determine the identifier of a missing item A-D.

In one embodiment of the system 500, an index is utilized which indicates which item identifiers ID were utilized in generating each encrypted identifier E(ID). The recipient also has a copy of the index and thus knows which identifiers ID were utilized in generating each of the encrypted identifiers E(ID). The recipient then utilizes the index and identifiers from items A-D on the pallet P to generate expected values for each of the encrypted identifiers E(ID), and then compares these expected values to the values of the actual encrypted identifiers read from the RFID tags T. Any discrepancy between these values indicates a potential problem which can be investigated further by the recipient.

One skilled in the art will realize that although the tags T storing the identifiers ID are described as being RFID tags, any other suitable type of readable tags could also be utilized. Furthermore, in the embodiment of FIG. 3 other physical characteristics of items could be utilized and various types of encoding or encryption can be used in the embodiment of FIG. 5. Finally, with regard to all the previously described embodiments of the present invention, the exact way in which the identifiers ID are arranged or distributed among the RFID tags T can be varied in other embodiments of the present invention.

Even though various embodiments and advantages of the present invention have been set forth in the foregoing description, the above disclosure is illustrative only, and changes may be made in detail and yet remain within the broad principles of the present invention. Therefore, the present invention is to be limited only by the appended claims.

What is claimed is:

1. A method of generating and associating identifiers for use in checking the integrity of stored items associated with a storage item, the method comprising:
    defining an identifier for each stored item;
    defining an identifier for the storage item;
    storing the identifiers in a plurality of readable tags, with a plurality of identifiers being stored in each readable tag;
    attaching each readable tag to one of the items; and
    wherein the plurality of identifiers stored in each readable tag includes the identifier associated with the item to which the readable tag is attached and the identifier associated with at least one other selected item.

2. The method of claim 1 wherein storing the identifiers in readable tags includes storing a first identifier in each tag and wherein attaching each readable tag to one of the items comprises attaching the tag to the item associated with the first identifier.

3. The method of claim 1 wherein storing the identifiers includes, prior to storing at least some of the identifiers, encrypting the identifiers and then storing these encrypted identifiers in the tags.

4. The method of claim 1 wherein each identifier is stored in three readable tags.

5. The method of claim 1 wherein the number of readable tags in which each identifier is stored varies for at least some identifiers, with some identifiers being stored in more tags than other ones of the identifiers.

6. The method of claim 1 further comprising storing additional information related to each item in the readable tags.

7. The method of claim 6 wherein the additional information comprises physical information about the associated item.

8. The method of claim 7 wherein the physical information is either a weight or a volume of the associated item.

9. The method of claim 1 further comprising defining identifiers for additional storage items and wherein identifiers for at least some stored items associated with a first one of the storage items are stored in readable tags for stored items associated with at least one of the other storage items.

10. The integrity checking system of claim 1 wherein the plurality of identifiers stored in each readable tag includes the identifier associated with the item to which the readable tag is attached and the identifier associated with at least one other random item stored on or to be stored on the storage item.

11. A method generating checking the integrity of items associated with a storage item, the method comprising:
defining an identifier for each item;
defining an identifier for the storage item;
storing the identifiers in a plurality of readable tags, with a plurality of identifiers being stored in each readable tag;
attaching each readable tag to one of the items; and
wherein a sequence of N identifiers is defined from the identifiers, and wherein each identifier is stored in a corresponding readable tag and in the readable tags corresponding to the next two identifiers in the sequence, and wherein the sequence wraps back on itself for the determining the identifiers stored in the readable tags associated with the N and N-1 identifiers in the sequence.

12. A method of performing an integrity check to identify missing stored items contained on a storage item, a readable tag being attached to each stored item and to the storage item, the method comprising:
reading identifiers stored in each of the readable tags, wherein each readable tag includes at least two identifiers and wherein at least one of the two identifiers stored in each tag is associated with another item; and
using only information read from the readable tags, determining whether any stored item supposed to be stored on the storage item is missing from the storage item.

13. The method of claim 12 wherein multiple identifiers are stored in each readable tag.

14. The method of claim 12 wherein a single identifier is stored in each readable tag and multiple readable tags are associated with each item.

15. The integrity checking system of claim 12 wherein the tag reading device is further operable using only information from the read tags to provide information indicating whether any of the items have been altered.

16. An integrity checking system, comprising:
a tag programming device operable to generate a plurality of unique identifiers, each unique identifier being associated with either a storage item or stored item to be stored by the storage item, and the programming device further operable to store each of the unique identifiers in a plurality of readable tags, each readable tag adapted to be attached to a corresponding item; and
a tag reading device operable to read the unique identifiers stored in the readable tags and operable using only information from the read tags to provide information indicating whether any stored item supposed to be stored by the storage item is missing from the storage item.

17. The integrity checking system of claim 16 wherein the tag reading device is further operable using only information from the read tags to provide information indicating whether any of the items have been altered.

18. The integrity checking system of claim 17,
wherein the programming device is further operable to store additional information related to at least some of the items in the readable tags; and
wherein the tag reading device is further operable to utilize this additional information for indicating whether any of the items have been altered.

19. The integrity checking system of claim 18 wherein the additional information comprises physical information about the corresponding items.

20. The integrity checking system of claim 16 wherein the readable tags comprise RFID tags and wherein the storage item comprises a pallet.

21. The integrity checking system of claim 16 wherein each readable tag comprises first and second tags, the first tag storing the identifier for a corresponding item and being attached to the item, and the second tag storing identifiers for other items and being attached to the item.

* * * * *

UNITED STATES PATENT AND TRADEMARK OFFICE
CERTIFICATE OF CORRECTION

PATENT NO. : 7,690,559 B2  Page 1 of 1
APPLICATION NO. : 11/440650
DATED : April 6, 2010
INVENTOR(S) : Craig Peter Sayers et al.

It is certified that error appears in the above-identified patent and that said Letters Patent is hereby corrected as shown below:

In column 10, line 13, in Claim 16, after "or" insert -- a --.

Signed and Sealed this

Fifth Day of October, 2010

David J. Kappos
*Director of the United States Patent and Trademark Office*